United States Patent
Moura et al.

(10) Patent No.: US 10,571,125 B2
(45) Date of Patent: Feb. 25, 2020

(54) QUENCH APERTURE BODY FOR A TURBINE ENGINE COMBUSTOR

(71) Applicant: United Technologies Corporation, Farmington, CT (US)

(72) Inventors: Dennis M. Moura, South Windsor, CT (US); Jonathan J. Eastwood, Newington, CT (US); Lee E. Bouldin, Woodbridge, CT (US); Monica Pacheco-Tougas, Waltham, MA (US)

(73) Assignee: United Technologies Corporation, Farmington, CT (US)

( * ) Notice: Subject to any disclaimer, the term of this patent is extended or adjusted under 35 U.S.C. 154(b) by 878 days.

(21) Appl. No.: 15/029,517

(22) PCT Filed: Oct. 31, 2014

(86) PCT No.: PCT/US2014/063440
§ 371 (c)(1),
(2) Date: Apr. 14, 2016

(87) PCT Pub. No.: WO2015/116269
PCT Pub. Date: Aug. 6, 2015

(65) Prior Publication Data
US 2016/0238250 A1    Aug. 18, 2016

Related U.S. Application Data

(60) Provisional application No. 61/899,570, filed on Nov. 4, 2013.

(51) Int. Cl.
*F23R 3/06* (2006.01)
*F23R 3/04* (2006.01)
(Continued)

(52) U.S. Cl.
CPC ............. *F23R 3/002* (2013.01); *F23R 3/06* (2013.01); *F02C 7/18* (2013.01); *F05D 2250/14* (2013.01);
(Continued)

(58) Field of Classification Search
CPC .... F02C 7/12; F02C 7/18; F23R 3/002; F23R 3/04; F23R 3/045; F23R 3/06;
(Continued)

(56) References Cited

U.S. PATENT DOCUMENTS 3,303,645 A * 2/1967 Ishibashi ................ F23R 3/045
60/755
4,302,941 A * 12/1981 DuBell .................... F23R 3/002
60/757
(Continued)

FOREIGN PATENT DOCUMENTS

GB    2017827 A    10/1979
GB    2356041 A    5/2001

OTHER PUBLICATIONS

EP search report for EP14880515.3 dated Oct. 28, 2016.

*Primary Examiner* — Steven M Sutherland
*Assistant Examiner* — James P McGlynn
(74) *Attorney, Agent, or Firm* — Getz Balich LLC

(57) ABSTRACT

An assembly for a turbine engine includes a combustor wall. The combustor wall includes a shell, a heat shield and an annular land. The heat shield is attached to the shell. The land extends vertically between the shell and the heat shield. The land extends laterally between a land outer surface and an inner surface, which at least partially defines a quench aperture in the combustor wall. A lateral distance between the land outer surface and the inner surface varies around the quench aperture.

10 Claims, 13 Drawing Sheets

(51) Int. Cl.
*F02C 7/18* (2006.01)
*F23R 3/00* (2006.01)

(52) U.S. Cl.
CPC .......... *F05D 2250/141* (2013.01); *F23R 3/04* (2013.01); *F23R 3/045* (2013.01)

(58) Field of Classification Search
CPC .. F23R 2900/03041; F23R 2900/03042; F23R 2900/03043; F23R 2900/03044; F05D 2250/14; F05D 2250/141; F05D 2260/201; F05D 2260/941
See application file for complete search history.

(56) References Cited

U.S. PATENT DOCUMENTS

| | | | |
|---|---|---|---|
| 4,653,279 A | 3/1987 | Reynolds | |
| 5,560,197 A * | 10/1996 | Ansart | F02K 1/822 60/800 |
| 6,351,949 B1 | 3/2002 | Rice et al. | |
| 6,810,673 B2 | 11/2004 | Snyder | |
| 7,000,397 B2 * | 2/2006 | Pidcock | F23R 3/002 60/752 |
| 7,093,441 B2 | 8/2006 | Burd et al. | |
| 7,954,325 B2 | 6/2011 | Burd et al. | |
| 8,015,829 B2 | 9/2011 | Coughlan, III et al. | |
| 8,056,342 B2 | 11/2011 | Shelley et al. | |
| 8,397,511 B2 * | 3/2013 | Chen | F01D 9/023 60/752 |
| 8,443,610 B2 | 5/2013 | Hoke et al. | |
| 8,739,546 B2 * | 6/2014 | Snyder | F23R 3/06 60/752 |
| 2002/0116929 A1 | 8/2002 | Snyder | |
| 2002/0184893 A1 | 12/2002 | Farmer et al. | |
| 2002/0189260 A1 | 12/2002 | David et al. | |
| 2003/0213250 A1 | 11/2003 | Pacheco-Tougas et al. | |
| 2010/0095679 A1 * | 4/2010 | Rudrapatna | F23R 3/005 60/752 |
| 2011/0048024 A1 | 3/2011 | Snyder et al. | |
| 2012/0144835 A1 * | 6/2012 | Taylor | F23R 3/002 60/755 |
| 2013/0025293 A1 | 1/2013 | Kim et al. | |
| 2013/0232980 A1 | 9/2013 | Chen et al. | |
| 2013/0255265 A1 | 10/2013 | Rudrapatna et al. | |
| 2013/0298564 A1 | 11/2013 | Agarwal | |

* cited by examiner

QUENCH APERTURE BODY FOR A TURBINE ENGINE COMBUSTOR

This application claims priority to PCT Patent Application No. PCT/US14/063440 filed Oct. 31, 2014 which claims priority to U.S. Patent Application No. 61/899,570 filed Nov. 4, 2013, which are hereby incorporated herein by reference in their entireties.

BACKGROUND OF THE INVENTION

1. Technical Field

This disclosure relates generally to a turbine engine and, more particularly, to a combustor for a turbine engine.

2. Background Information

A floating wall combustor for a turbine engine typically includes a bulkhead that extends radially between inner and outer combustor walls. Each of the combustor walls includes a shell and a heat shield, which defines a radial side of a combustion chamber. Each of the combustor walls also includes a plurality of quench apertures, which direct air from a plenum into the combustion chamber. Cooling cavities extend radially between the heat shield and the shell. These cooling cavities fluidly couple impingement apertures in the shell with effusion apertures in the heat shield.

There is a need in the art for an improved turbine engine combustor.

SUMMARY OF THE DISCLOSURE

According to an aspect of the invention, an assembly for a turbine engine is provided that includes a combustor wall. The combustor wall includes a shell, a heat shield and an annular land. The heat shield is attached to the shell. The land extends vertically between the shell and the heat shield. The land extends laterally between a land outer surface and an inner surface, which at least partially defines a quench aperture in the combustor wall. A lateral distance between the land outer surface and the inner surface varies around the quench aperture.

According to another aspect of the invention, another assembly for a turbine engine is provided that includes a combustor wall. The combustor wall includes a shell, a heat shield and an annular land. The heat shield is attached to the shell. The land extends between the shell and the heat shield. The land at least partially defines a quench aperture in the combustor wall. The land is aligned with an aperture defined by a surface of the shell. The land has a land outer surface with a cross-sectional geometry with a different shape than a cross-sectional geometry of the surface of the shell.

According to another aspect of the invention, a heat shield is provided for a turbine engine combustor wall through which a quench aperture radially extends. The heat shield includes a heat shield panel and an annular land. The heat shield panel includes a panel base and a plurality of rails. Each of the rails extends radially from the panel base. The land is connected to the panel base and located between the rails. The land extends laterally between a land outer surface and an inner surface that at least partially defines the quench aperture. A lateral distance between the land outer surface and the inner surface changes as the land extends around the inner surface.

The land outer surface may have a non-circular cross-sectional geometry. The land outer surface, for example, may have an oval cross-sectional geometry. In another example, the land outer surface may have a polygonal cross-sectional geometry. In another example, the land outer surface may include a plurality of facets. These facets may define a plurality of outside corners that are disposed around the land. Alternatively, the land outer surface may have a circular cross-sectional geometry.

The land may extend between the land outer surface and an inner surface that at least partially defines the quench aperture. The inner surface may have a circular cross-sectional geometry.

The land may extend between the land outer surface and an inner surface that at least partially defines the quench aperture. The inner surface may have a non-circular cross-sectional geometry.

The land may be aligned with an aperture defined by a surface of the shell that has a circular cross-sectional geometry.

The land may be aligned with an aperture defined by a surface of the shell that has a non-circular cross-sectional geometry.

A grommet may include the land and an annular rim, which extends from the land into or through an aperture defined by the shell. The rim may have a rim outer surface with a non-circular cross-sectional geometry.

A grommet may include the land and an annular rim, which extends from the land into or through an aperture defined by the shell. The rim may have a rim outer surface with a circular cross-sectional geometry.

A cavity may be defined between the shell and the heat shield. The cavity may fluidly couple one or more cooling apertures defined by the shell with one or more cooling apertures defined by the heat shield.

A first of the cooling apertures defined by the heat shield may be further defined by and extend through the land.

A combustor bulkhead may extend between the combustor wall and a second combustor wall. The combustor wall, the second combustor wall and the bulkhead may define a combustion chamber.

The cross-sectional geometry of the land outer surface may be a non-circular cross-sectional geometry. Alternatively, the cross-sectional geometry of the land outer surface may be a circular cross-sectional geometry.

A grommet may include the land and an annular rim, which extends radially from the land and away from the panel base. The rim may extend between the inner surface and a rim outer surface with a circular cross-sectional geometry. The land outer surface may have a non-circular cross-sectional geometry. Alternatively, the land outer surface may have a circular cross-sectional geometry.

A grommet may include the land and an annular rim, which extends radially from the land and away from the panel base. The rim may extend between the inner surface and a rim outer surface with a non-circular cross-sectional geometry. The land outer surface may have a non-circular cross-sectional geometry. Alternatively, the land outer surface may have a circular cross-sectional geometry.

The heat shield panel may include one or more mechanical attachments adapted to connect the heat shield panel to a combustor shell. A plurality of effusion apertures may be defined by and extend through the panel base.

The foregoing features and the operation of the invention will become more apparent in light of the following description and the accompanying drawings.

DETAILED DESCRIPTION OF THE INVENTION

Figure 1:
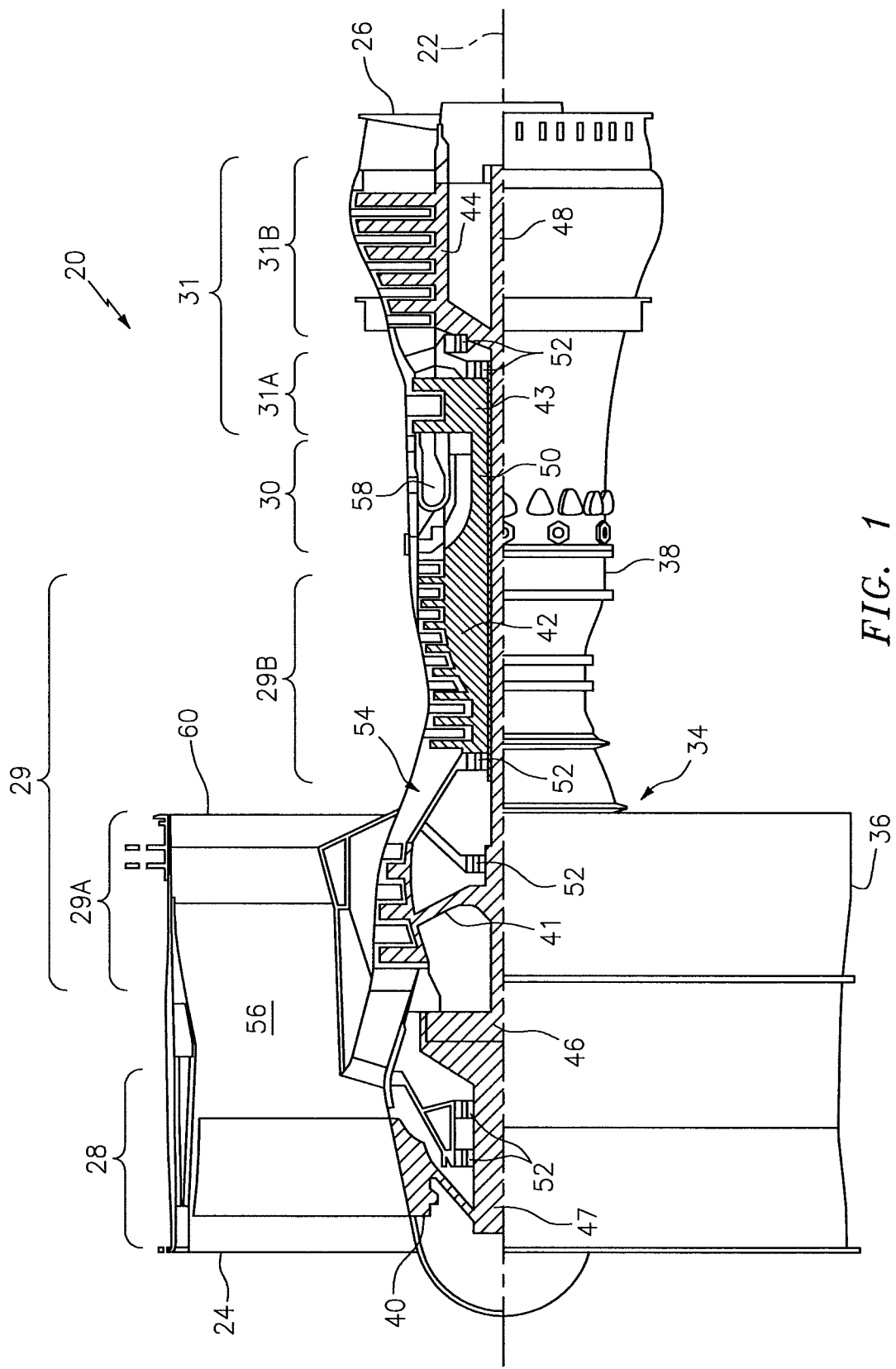
FIG. 1 is a side cutaway illustration of a geared turbine engine.

FIG. 1 is a side cutaway illustration of a geared turbine engine 20. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 34, which includes a first engine case 36 (e.g., a fan nacelle) and a second engine case 38 (e.g., a core nacelle).

Each of the engine sections 28, 29A, 29B, 31A and 31B includes a respective rotor 40-44. Each of the rotors 40-44 includes a plurality of rotor blades arranged circumferentially around and connected to (e.g., formed integral with or mechanically fastened, welded, brazed, adhered or otherwise attached to) one or more respective rotor disks. The fan rotor 40 is connected to a gear train 46 (e.g., an epicyclic gear train) through a shaft 47. The gear train 46 and the LPC rotor 41 are connected to and driven by the LPT rotor 44 through a low speed shaft 48. The HPC rotor 42 is connected to and driven by the HPT rotor 43 through a high speed shaft 50. The shafts 47, 48 and 50 are rotatably supported by a plurality of bearings 52. Each of the bearings 52 is connected to the second engine case 38 by at least one stator element such as, for example, an annular support strut.

Air enters the turbine engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air".

The core air is directed through the engine sections 29-31 and exits the turbine engine 20 through the airflow exhaust 26. Within the combustor section 30, fuel is injected into an annular combustion chamber 58 and mixed with the core air. This fuel-core air mixture is ignited to power the turbine engine 20 and provide forward engine thrust. The bypass air is directed through the bypass gas path 56 and out of the turbine engine 20 through a bypass nozzle 60 to provide additional forward engine thrust. Alternatively, the bypass air may be directed out of the turbine engine 20 through a thrust reverser to provide reverse engine thrust.

Figure 2:
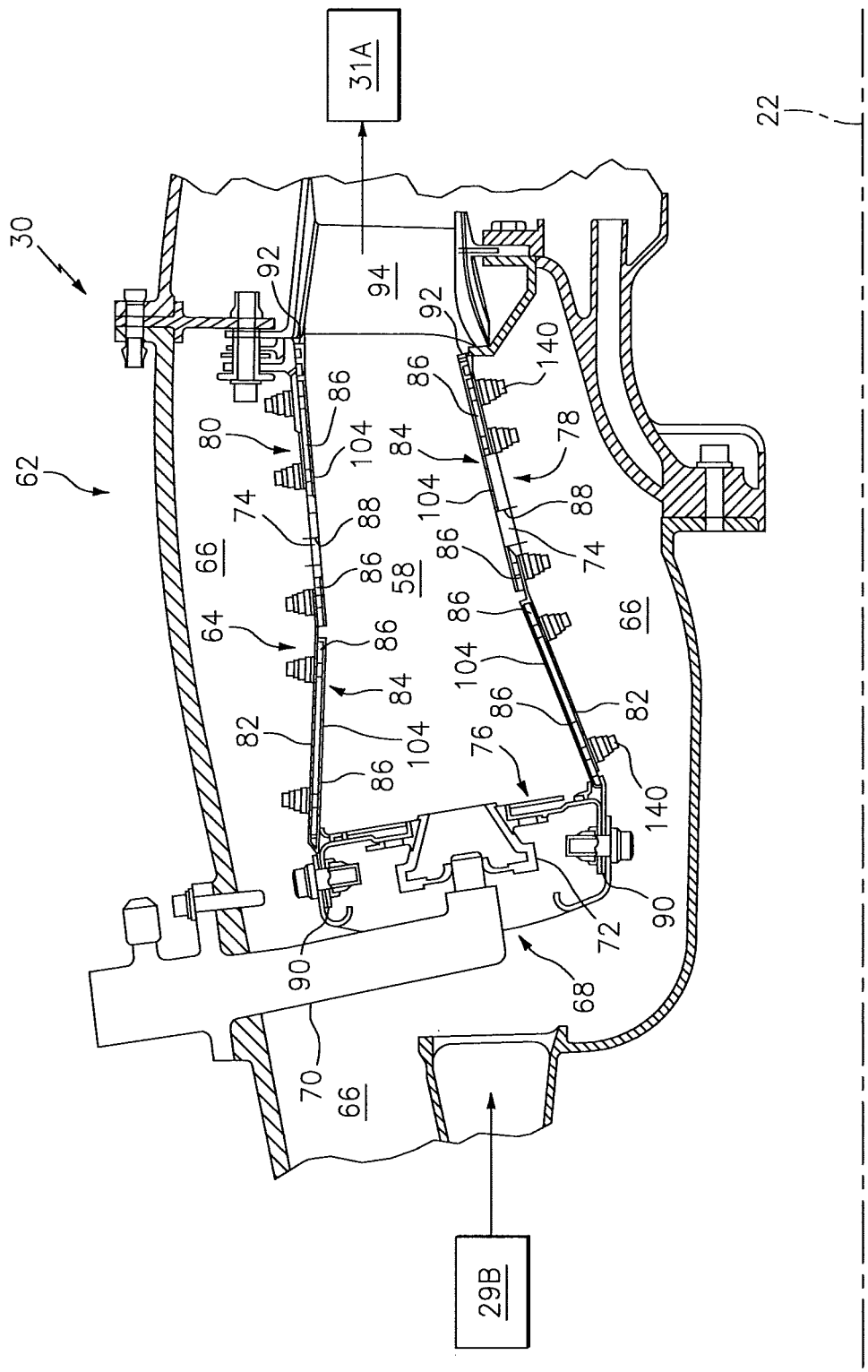
FIG. 2 is a side cutaway illustration of a portion of a combustor section.

FIG. 2 illustrates an assembly 62 of the turbine engine 20. The turbine engine assembly 62 includes a combustor 64 arranged within a plenum 66 (e.g., an annular plenum) of the combustor section 30. This plenum 66 receives compressed core air from the HPC section 29B, and provides the received core air to the combustor 64 as described below in further detail.

The turbine engine assembly 62 also includes one or more fuel injector assemblies 68. Each fuel injector assembly 68 may include a fuel injector 70 mated with a swirler 72. The fuel injector 70 injects the fuel into the combustion chamber 58. The swirler 72 directs some of the core air from the plenum 66 into the combustion chamber 58 in a manner that facilitates mixing the core air with the injected fuel. Quench apertures 74 in walls of the combustor 64 direct additional core air into the combustion chamber 58 for combustion; e.g., to stoichiometrically lean the fuel-core air mixture.

The combustor 64 may be configured as an annular floating wall combustor. The combustor 64 of FIGS. 2 and 3, for example, includes a combustor bulkhead 76, a tubular combustor inner wall 78, and a tubular combustor outer wall 80. The bulkhead 76 extends radially between and is connected to the inner wall 78 and the outer wall 80. The inner wall 78 and the outer wall 80 each extends axially along the centerline 22 from the bulkhead 76 towards the turbine section 31A, thereby defining the combustion chamber 58.

Referring to FIG. 2, the inner wall 78 and the outer wall 80 may each have a multi-walled structure; e.g., a hollow dual-walled structure. The inner wall 78 and the outer wall 80 of FIG. 2, for example, each includes a tubular combustor shell 82, a tubular combustor heat shield 84, and one or more cooling cavities 86 (e.g., impingement cavities) between the shell 82 and the heat shield 84. The inner wall 78 and the outer wall 80 also each includes one or more quench aperture bodies 88 (e.g., grommets), which are arranged circumferentially around the centerline 22. Each quench aperture body 88 partially or fully defines a respective one of the quench apertures 74 as described below in further detail.

The shell 82 extends circumferentially around the centerline 22. The shell 82 extends axially along the centerline 22 between an upstream end 90 and a downstream end 92. The shell 82 is connected to the bulkhead 76 at the upstream end 90. The shell 82 may be connected to a stator vane assembly 94 or the HPT section 31A at the downstream end 92.

Figure 3:
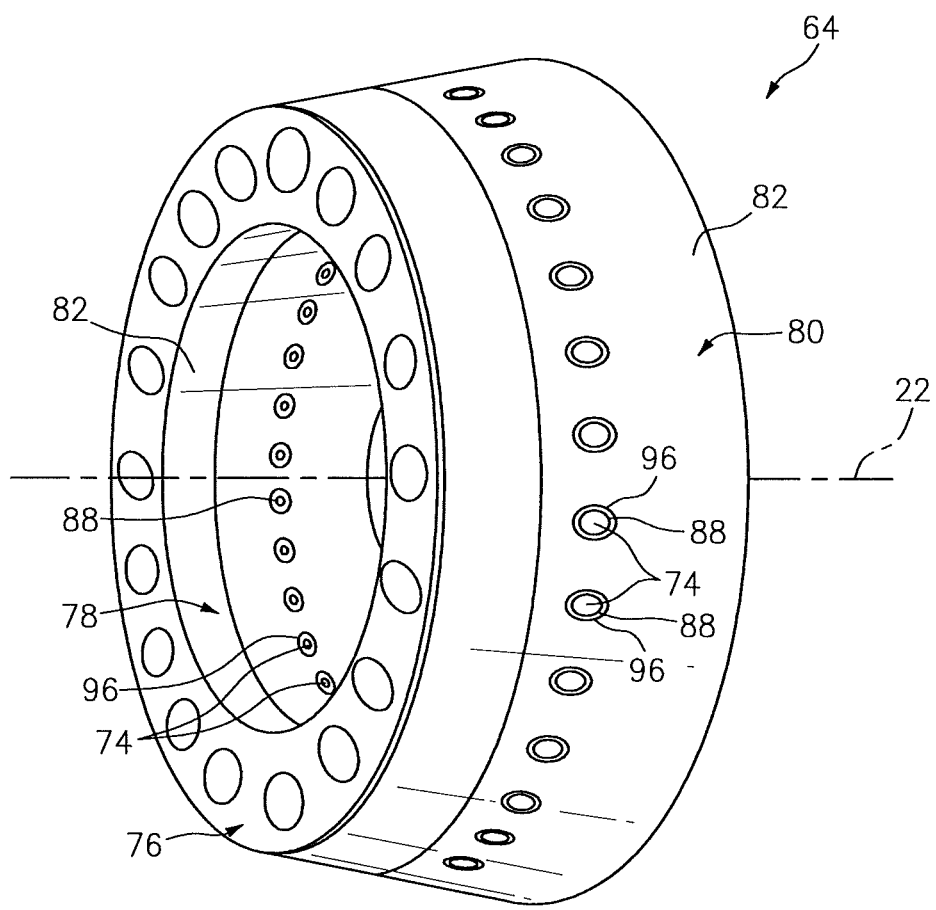
FIG. 3 is a perspective illustration of a portion of a combustor.
Figure 4:
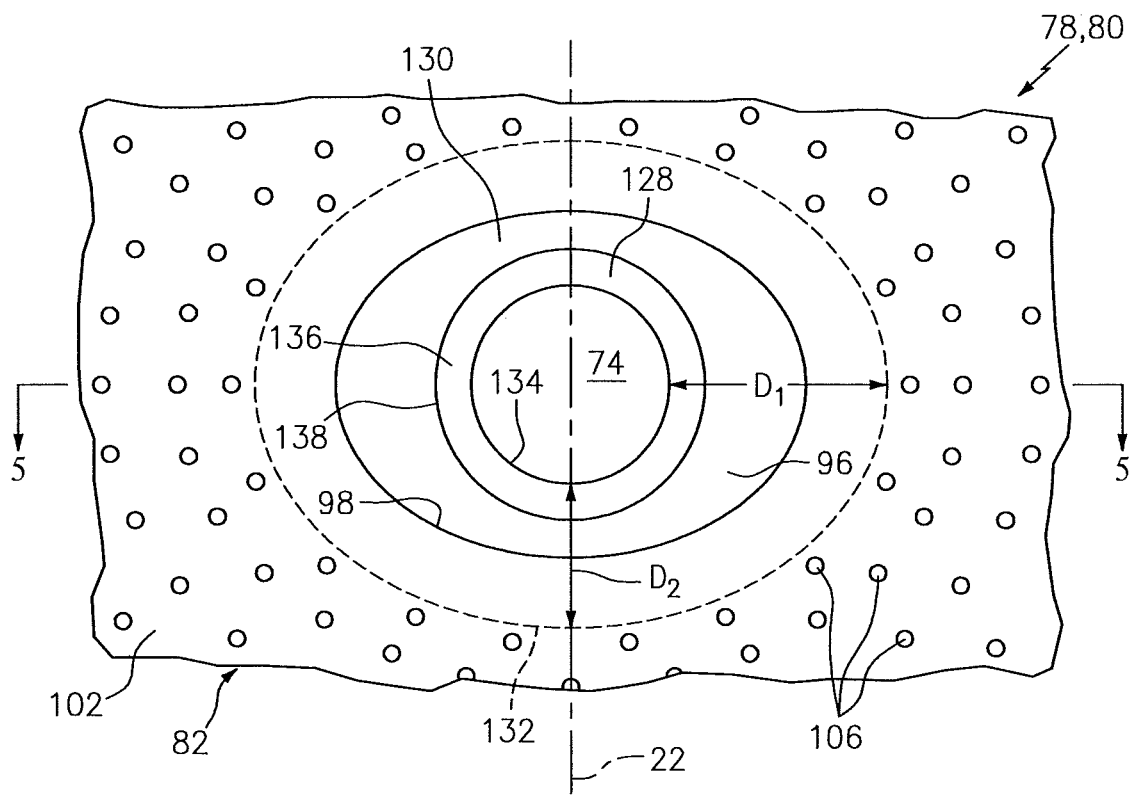
FIG. 4 is an illustration of a portion of a combustor wall with a ghost line of a shell land beneath a shell.
Figure 5:
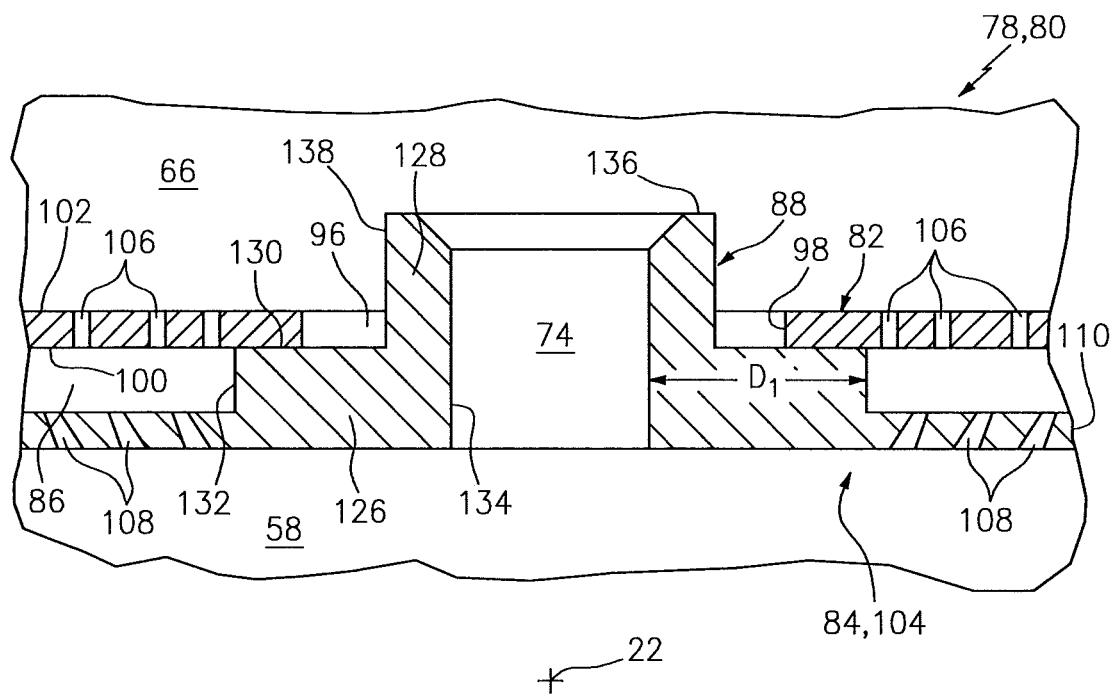
FIG. 5 is a cross-sectional illustration of the combustor wall portion of FIG. 4.

Referring to FIG. 3, the shell 82 includes a plurality of apertures 96 arranged circumferentially around the centerline 22. Referring to FIGS. 4 and 5, each of the apertures 96 may be defined by a surface 98 of the shell 82 that extends radially between opposing side surfaces 100 and 102 of the shell 82. The surface 98 of FIG. 4 has a circular cross-sectional geometry.

Referring to FIG. 2, the heat shield 84 extends circumferentially around the centerline 22. The heat shield 84 extends axially along the centerline 22 between an upstream end and a downstream end. The heat shield 84 may include one or more heat shield panels 104. These panels 104 may be arranged into one or more axial sets. The axial sets are arranged at discrete locations along the centerline 22. The panels 104 in each set are disposed circumferentially around the centerline 22 and form a hoop. Alternatively, the heat shield 84 may be configured from one or more tubular bodies.

Figure 6:
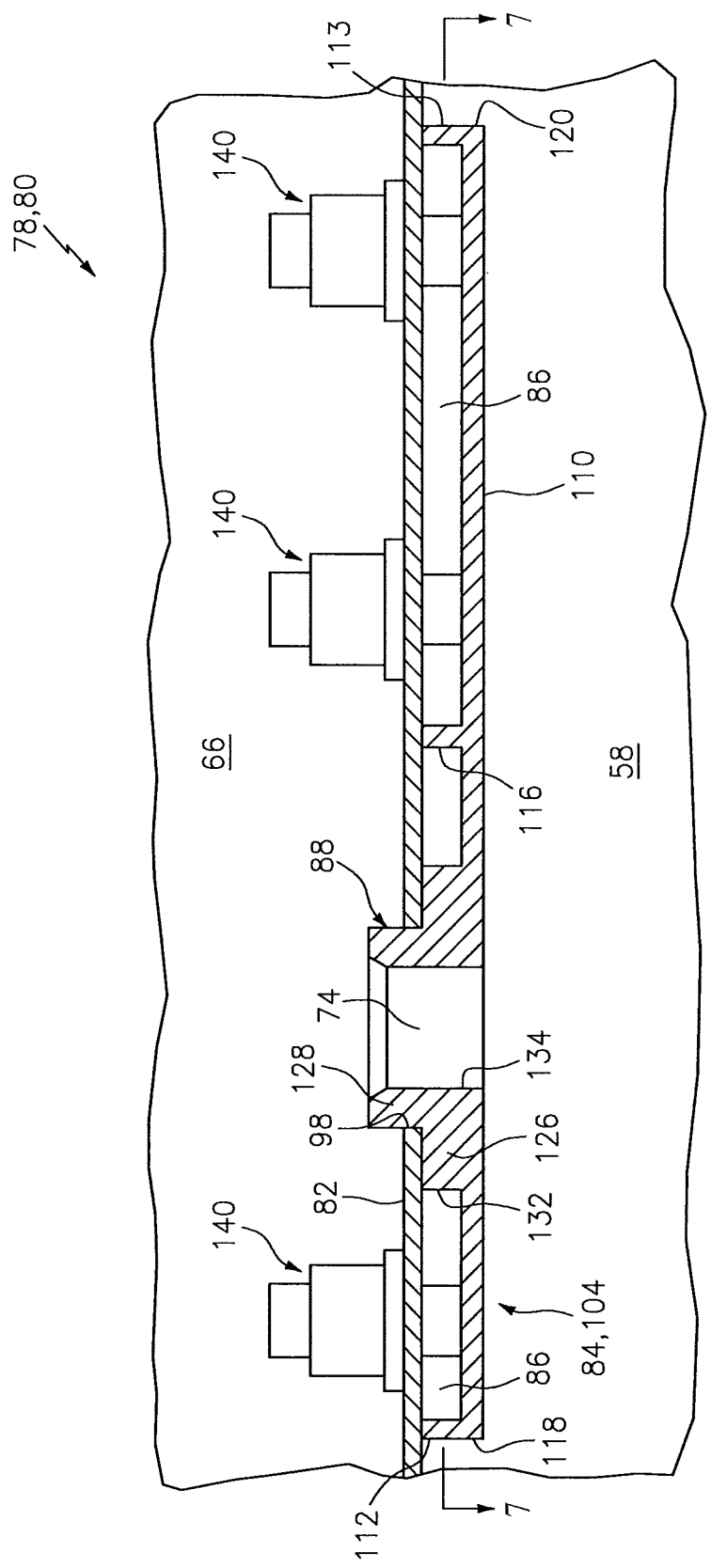
FIG. 6 is a side sectional illustration of a portion of the combustor wall.
Figure 7:
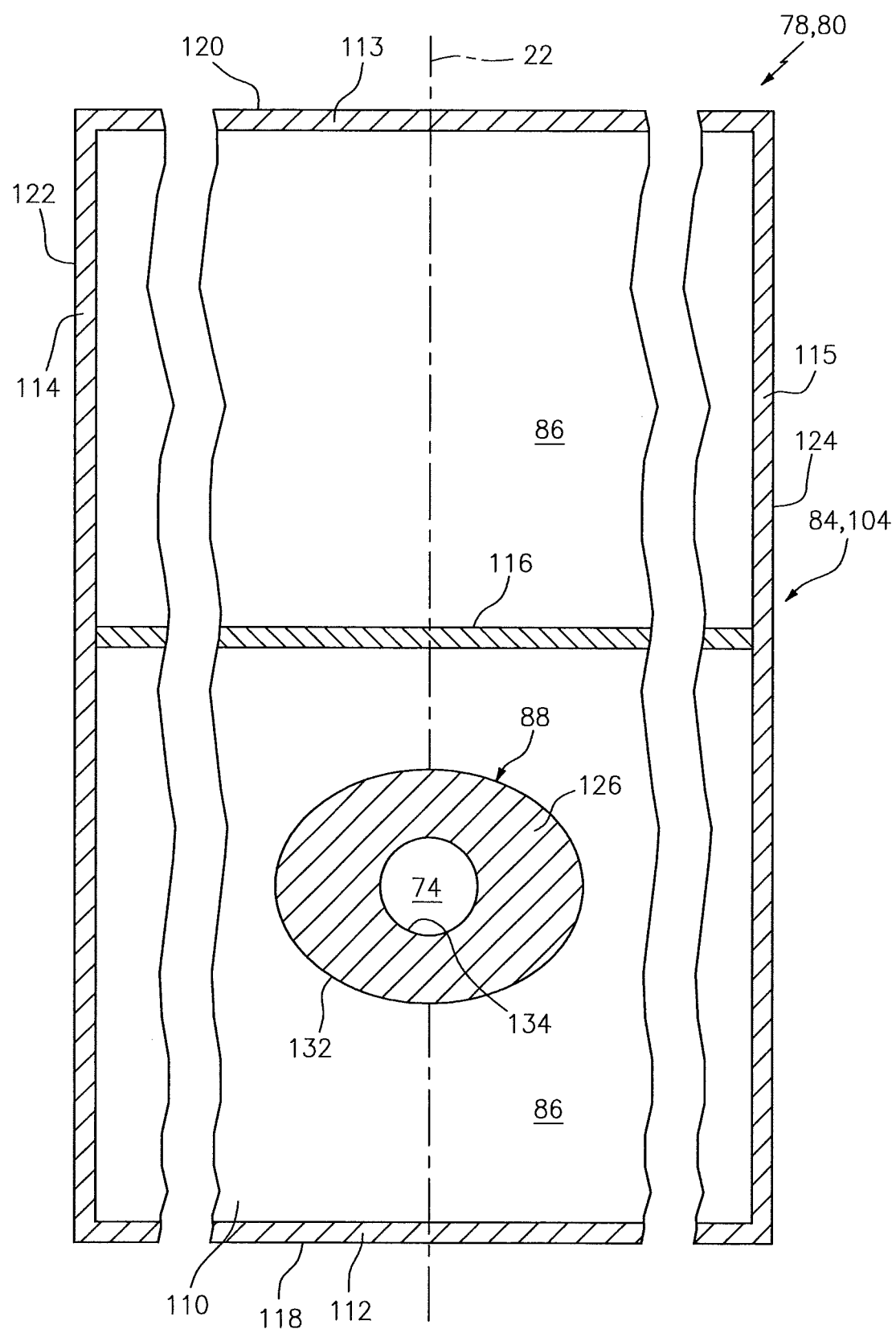
FIG. 7 is a circumferential sectional illustration of combustor wall portion of FIG. 6.

FIGS. 6 and 7 illustrate exemplary portions of one of the walls 78, 80. It should be noted that the shell 82 and the heat shield 84 each respectively include one or more cooling apertures 106 and 108 (see FIG. 5) as described below in further detail. For ease of illustration, however, the shell 82 and the heat shield 84 of FIGS. 6 and 7 are shown without the cooling apertures 106 and 108.

Each of the panels 104 includes a panel base 110 and one or more panel rails (e.g., rails 112-116). The panel base 110 may be configured as a generally curved (e.g., arcuate) plate. The panel base 110 extends axially between an upstream axial end 118 and a downstream axial end 120. The panel base 110 extends circumferentially between opposing circumferential ends 122 and 124.

The panel rails may include one or more circumferentially extending end rails 112 and 113 and one more axially extending end rails 114 and 115. The panel rails may also include at least one intermediate rail 116. Each of the panel rails 112-116 of the outer wall 80 extends radially out from the panel base 110 (see FIG. 2). Each of the panel rails 112-116 of the inner wall 78 extends radially in from the panel base 110 (FIG. 2). The rail 112 is arranged at (e.g., on, adjacent or proximate) the axial end 118. The rail 113 is arranged at the axial end 120. The rails 114 and 115 extend axially between and are connected to the rails 112 and 113. The rail 114 is arranged at the circumferential end 122. The rail 115 is arranged at the circumferential end 124. The rail 116 is arranged axially between the rails 112 and 113, and extends and is connected circumferentially between the rails 114 and 115.

Each quench aperture body 88 extends within a respective one of the cooling cavities 86. Each quench aperture body 88, for example, may be arranged circumferentially between the rails 114 and 115 of a respective one of the panels 104. Each quench aperture body 88 may be arranged axially between the rails 112 and 116 of a respective one of the panels 104.

One or more of the quench aperture bodies 88 are connected to a respective one of the panels 104. The quench aperture body 88 of FIG. 5, for example, is formed integral with the respective panel base 110. The quench aperture body 88 and the panel base 110, for example, may be cast and/or machined as a unitary body. The quench aperture body 88, however, may alternatively be formed as a discrete element and subsequently attached (e.g., bonded and/or mechanically fastened) to the respective panel base 110.

Referring to FIGS. 4 and 5, each quench aperture body 88 includes an annular shell land 126 and an annular rim 128. The land 126 extends radially from the respective panel base 110 to a distal land surface 130. The land 126 extends laterally between a land outer surface 132 and a body inner surface 134, which defines the respective quench aperture 74.

The outer surface 132 of FIG. 4 has an oval cross-sectional geometry with a major axis and a minor axis. The major axis extends circumferentially around the centerline 22. The minor axis extends along the centerline 22. The cross-sectional geometry of the outer surface 132, however, is not limited to the foregoing orientation. The inner surface 134 of FIG. 4 has a circular cross-sectional geometry. Therefore, with the land 126 configuration of FIGS. 4 and 5, a lateral distance D between the land out surface 132 and the inner surface 134 may change as the land 126 extends around the inner surface 134 and the respective quench aperture 74. The lateral distance $D_1$ along the major axis of the land outer surface 132, for example, is greater than the lateral distance $D_2$ along the minor axis of the land outer surface 132.

The rim 128 is connected to the land 126. The rim 128 extends radially from the land 126 and the land surface 130 to a distal rim surface 136. The rim 128 extends laterally between a rim outer surface 138 and the inner surface 134. The outer surface 138 of FIG. 4 has a circular cross-sectional geometry.

Referring to FIG. 2, the heat shield 84 of the inner wall 78 circumscribes the shell 82 of the inner wall 78, and defines a radial inner side of the combustion chamber 58. The heat shield 84 of the outer wall 80 is arranged radially within the shell 82 of the outer wall 80, and defines a radial outer side of the combustion chamber 58 that is opposite the inner side. Referring now to FIG. 5, each quench aperture body 88 is (e.g., axially and circumferentially) aligned and mated with a respective one of the apertures 96. Each rim 128, for example, extends radially through (or into) a respective one of the apertures 96. Each land surface 130 may engage (e.g., slidingly contact) the surface 100 and, thus, the shell 82.

Referring to FIG. 2, each heat shield 84 and, more particularly, each panel 104 may be respectively attached to the shell 82 by a plurality of mechanical attachments 140 (see also FIG. 6). The shells 82 and the heat shields 84 thereby respectively form the cooling cavities 86 in the inner and the outer walls 78 and 80. For example, referring to FIGS. 6 and 7, each cooling cavity 86 may extend circumferentially between the rails 114 and 115 of a respective one of the panels 104. Some of the cooling cavities 86 may extend axially between the rails 112 and 116 of a respective one of the panels 104. Some of the cooling cavities 86 may extend axially between the rails 113 and 116 of a respective one of the panels 104. Each cooling cavity 86 extends radially between the shell 82 and the panel base 110 of a respective one of the panels 104.

Referring to FIG. 5, each cooling cavity 86 may fluidly couple one or more of the cooling apertures 106 in the shell 82 with one or more of the cooling apertures 108 in the heat shield 84. One or more of the cooling apertures 106 may each be configured as an impingement aperture, which extends radially through the shell 82. One or more of the cooling apertures 108 may each be configured as an effusion aperture, which extends radially through the heat shield 84 and, more particularly, the respective panel base 110.

During turbine engine operation, core air from the plenum 66 is directed into each cooling cavity 86 through respective cooling apertures 106. This core air (hereinafter referred to as "cooling air") may impinge against the panel base 110, thereby impingement cooling the heat shield 84. The cooling air within each cooling cavity 86 is subsequently directed through respective cooling apertures 108 and into the combustion chamber 58, thereby film cooling a downstream portion of the heat shield 84. Within each cooling aperture 108, the cooling air may also cool the heat shield 84 through convective heat transfer.

Figure 8:
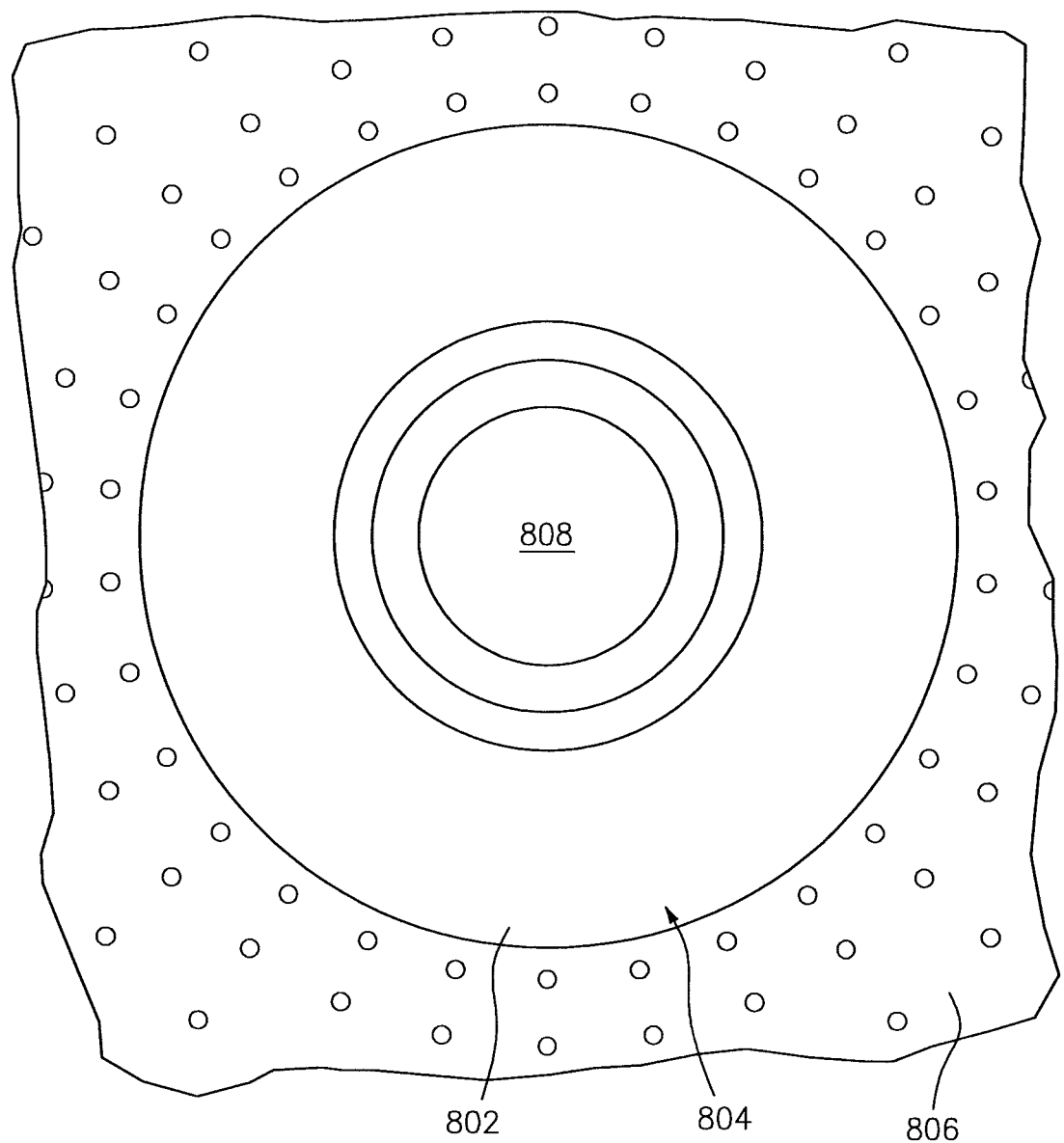
FIG. 8 an illustration of a portion of a combustor wall with a ghost line of a shell land beneath a shell.

As a temperature of the heat shield 84 increases, thermal distortion of the heat shield 84 may cause one or more of the quench aperture bodies 88 to move circumferentially and/or axially relative to the shell 82. Referring to FIG. 8, a land 802 of a typical quench aperture grommet 804 has a circular geometry that is oversized to accommodate the foregoing thermally induce movement between the heat shield and the shell 806. This oversize geometry land 802, however, may block cooling air from impinging against the panel base of the heat shield near the quench aperture 808. A region of the panel base below and proximate the land 802 therefore may be subjected to relatively high temperatures and, thus, thermally induced stresses.

Figure 9:
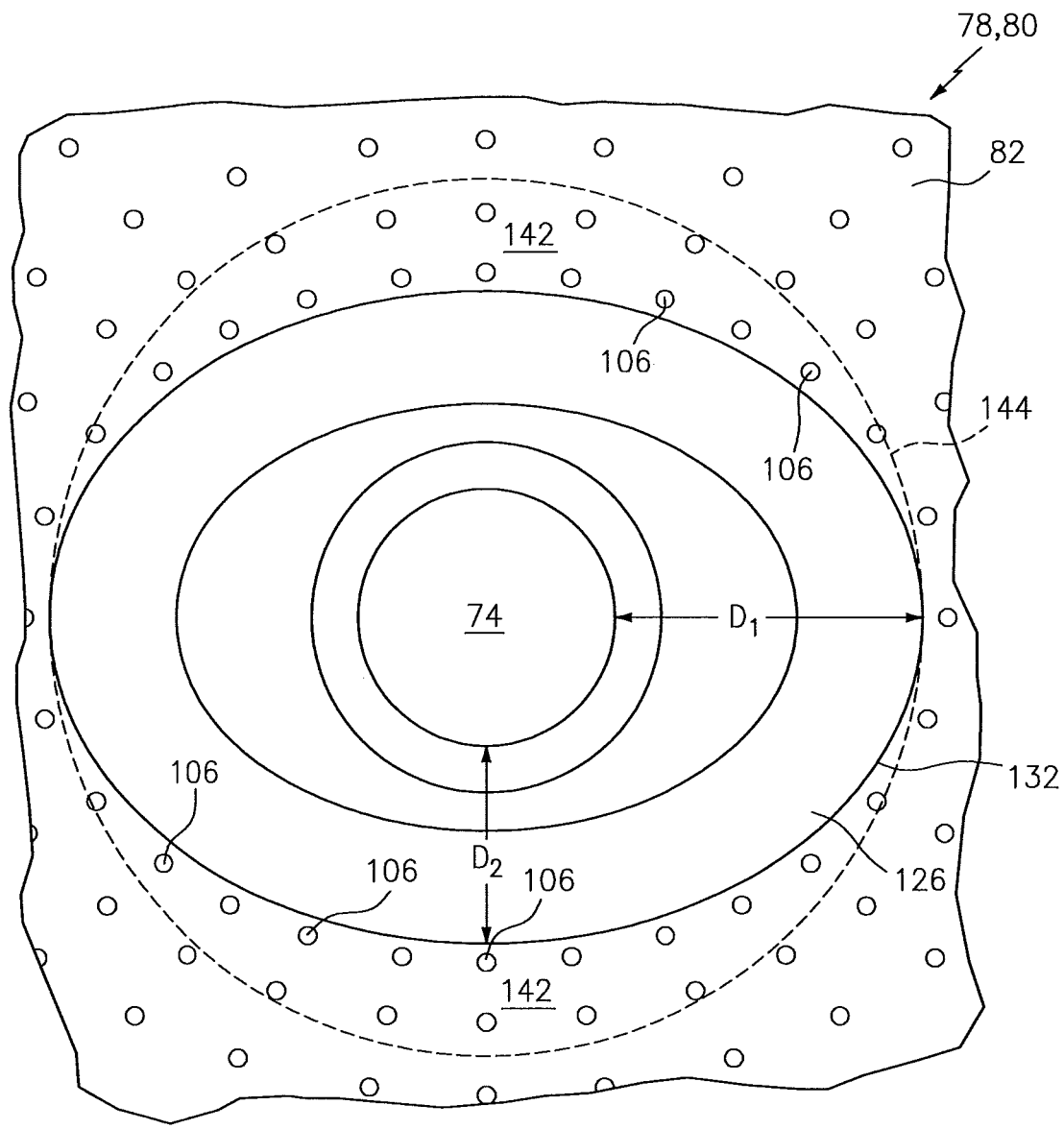
FIG. 9 is an illustration of a portion of a combustor wall with a ghost line of a shell land beneath a shell and a ghost line of the shell land of FIG. 8.

The inventors of the present invention have recognized that a magnitude of the circumferential movement may be greater than a magnitude of the axial movement, or vice versa depending upon the configuration of the combustor 64. Thus, referring to FIG. 9, the elongated geometry of each land 126 may be tailored to accommodate skewed thermally induced movement between the heat shield 84 and the shell 82; e.g., the distance $D_1$ may be sized greater than the distance $D_2$ to accommodate the greater magnitude of circumferential thermal expansion. In addition, the elongated geometry of each land 126 may enable more of the cooling air directed from the cooling apertures 106 to impinge and/or flow relatively close to the quench aperture 74 in regions 142 aligned with the minor axis. Similarly, the elongated geometry of each land 126 may also or alternatively enable some of the cooling apertures 108 (not shown) to be located relatively close to the quench aperture 74 in the regions 142. Notably, these regions 142 include portions of the panel base 110 which would otherwise be blocked by the typical circular land as illustrated by the dashed line 144. The cooling quench aperture bodies 88 therefore may increase the cooling effectiveness of the heat shield 84 as compared to the circular land 802 embodiment of FIG. 8.

Figure 10:
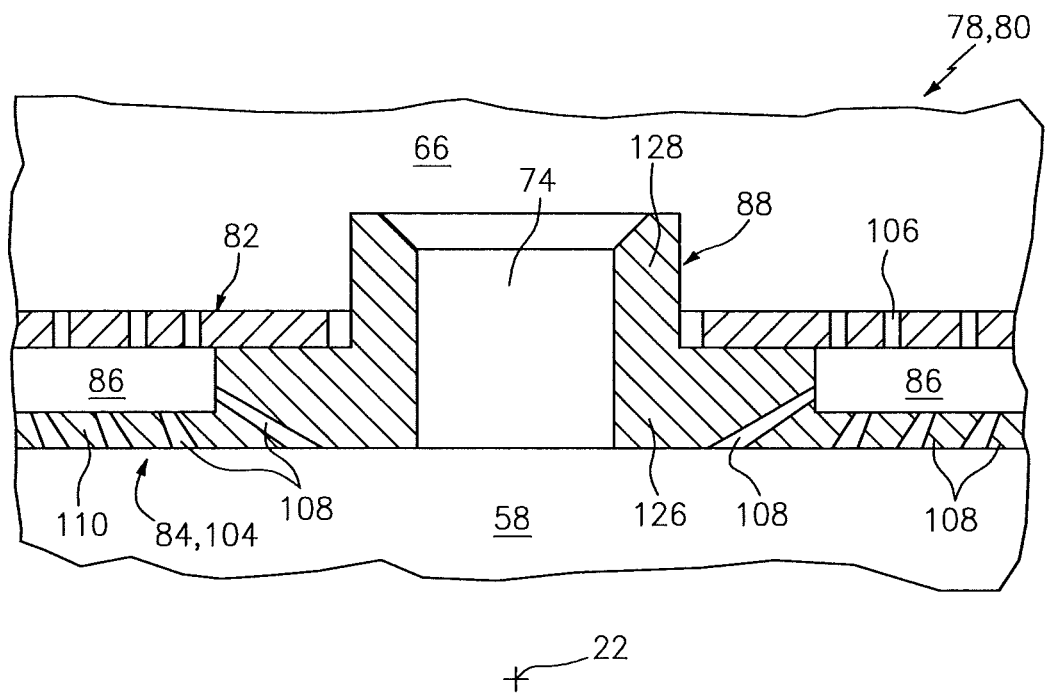
FIG. 10 is a cross-sectional illustration of a portion of an alternate embodiment combustor wall.

In some embodiments, referring to FIG. 10, one or more of the cooling apertures 108 may be defined by and/or extend (e.g., radially) through a respective one of the lands 126 and/or through the panel base 110. In this manner, additional thermal energy may be convectively transferred into the cooling air thereby further reducing the temperature of the land 126 and the adjacent portion of the panel base 110.

Figure 11:
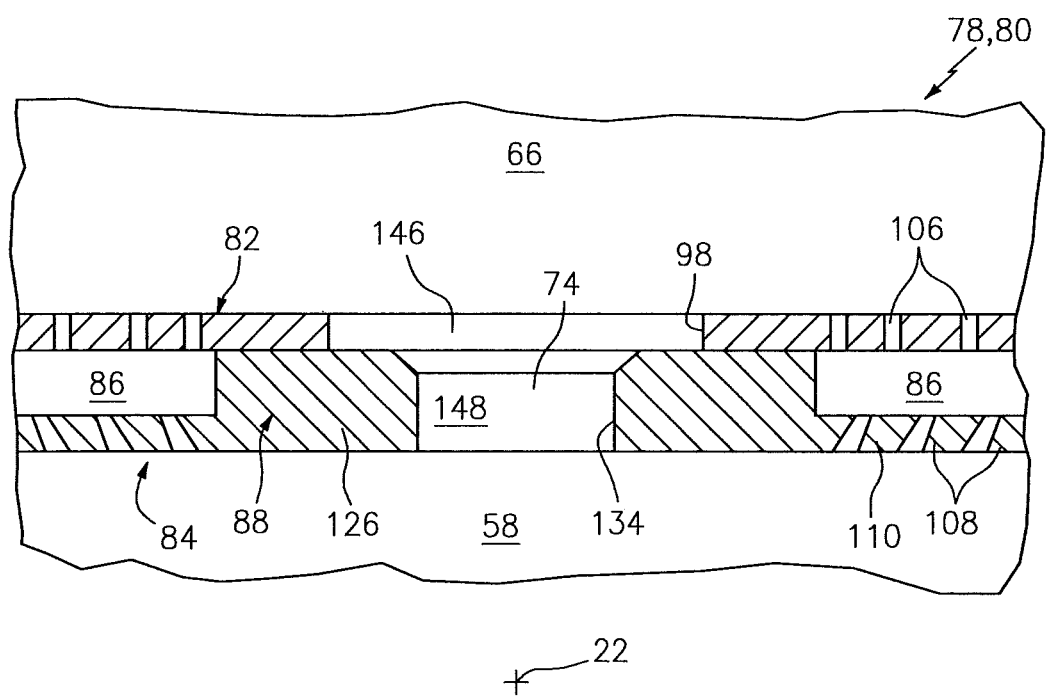
FIG. 11 is a cross-sectional illustration of a portion of an alternate embodiment combustor wall.

In some embodiments, referring to FIG. 11, one or more of the quench aperture bodies 88 may each be configured without the rim 128 (see FIG. 10). In this manner, the surface 98 of the shell 82 may from a first portion 146 of a respective one of the quench apertures 74. The inner surface 134 of the quench aperture body 88 may form a second portion 148 of a respective one of the quench apertures 74, which is adjacent the first portion 146.

One or more of the surfaces 98, 132, 134 and 138 may each have various configurations other than those described above. For example, one or more of the surfaces 98, 132, 134 and 138 may each have a circular cross-sectional geometry. One or more of the surfaces 98, 132, 134 and 138 may also or alternatively each have a non-circular cross-sectional geometry and/or a compound cross-sectional geometry. Examples of a non-circular cross-sectional geometry include, but are not limited to, an oval cross-sectional geometry and a polygonal cross-sectional geometry. Examples of a polygonal cross-sectional geometry include, but are not limited to, a rectangular cross-sectional geometry, a triangular cross-sectional geometry, a hexagonal cross-sectional geometry, an octagonal cross-sectional geometry, a star-shaped cross-sectional geometry, and an asterisk-shaped cross-sectional geometry. Examples of a compound cross-sectional geometry include, but are not limited to, a cross-sectional geometry having a (e.g., generally circular or oval) central portion surrounded by a plurality of peripheral portions with smaller similar (e.g., circular or oval) shapes or different (e.g., triangular, polygonal) shapes; e.g., one or more pedals around a central portion. Some examples of these different surface configurations are described below and illustrated in FIGS. 12-16, some of which do not show the apertures 106 for ease of illustration. The present invention, however, is not limited to any particular surface configurations.

Figure 12:
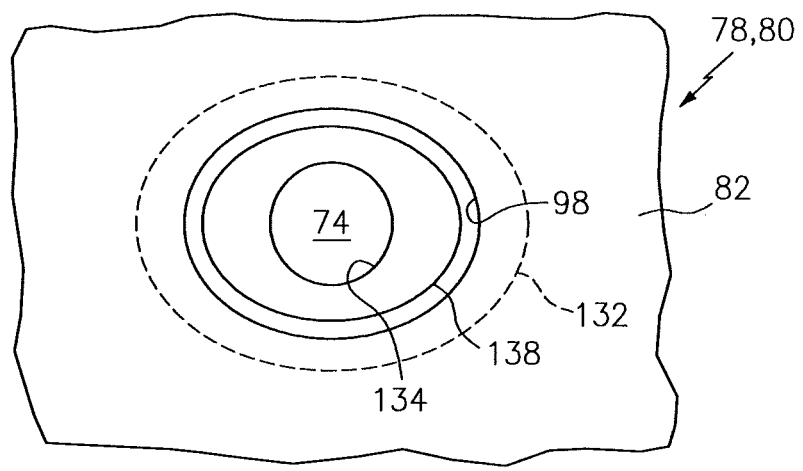
FIG. 12 is an illustration of a portion of an alternate embodiment combustor wall with a ghost line of a shell land beneath a shell.

In some embodiments, referring to FIG. 12, the surface 98 may have an oval cross-sectional geometry. The outer surface 132 may have an oval cross-sectional geometry. The inner surface 134 may have a circular cross-sectional geometry. The outer surface 138 may have an oval cross-sectional geometry. The cross-sectional geometries of one or more of the surfaces 132, 134 and 138 may be disproportional to the cross-sectional geometry of the surface 98; e.g., ratios of lengths along the minor and major axes may be different.

Figure 13:
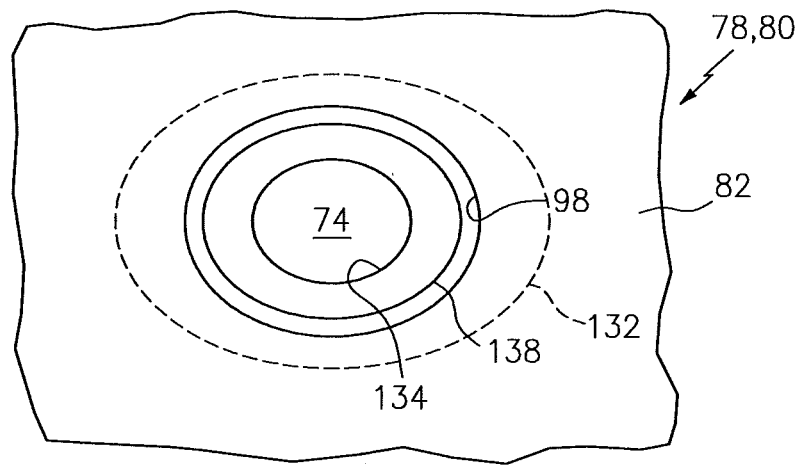
FIG. 13 is an illustration of a portion of an alternate embodiment combustor wall with a ghost line of a shell land beneath a shell.

In some embodiments, referring to FIG. 13, the surface 98 may have an oval cross-sectional geometry. The outer surface 132 may have an oval cross-sectional geometry. The inner surface 134 may have an oval cross-sectional geometry. The outer surface 138 may have an oval cross-sectional geometry. The cross-sectional geometries of one or more of the surfaces 134 and 138 may be disproportional to the cross-sectional geometry of the surface 98. The cross-sectional geometry of one of the surfaces 98, 134 and 138, however, may be proportional to the cross-sectional geometry of the surface 132; e.g., ratios of lengths along the minor and major axes may be substantially equal.

Figure 14:
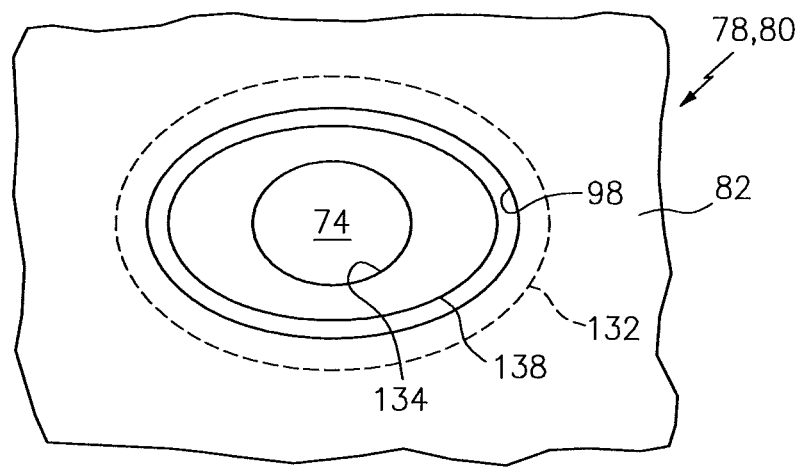
FIG. 14 is an illustration of a portion of an alternate embodiment combustor wall with a ghost line of a shell land beneath a shell.

In some embodiments, referring to FIG. 14, the surface 98 may have an oval cross-sectional geometry. The outer surface 132 may have an oval cross-sectional geometry. The inner surface 134 may have an oval cross-sectional geometry. The outer surface 138 may have an oval cross-sectional geometry. The cross-sectional geometries of one or more of the surfaces 132, 134 and 138 may be disproportional to the cross-sectional geometry of the surface 98.

Figure 15:
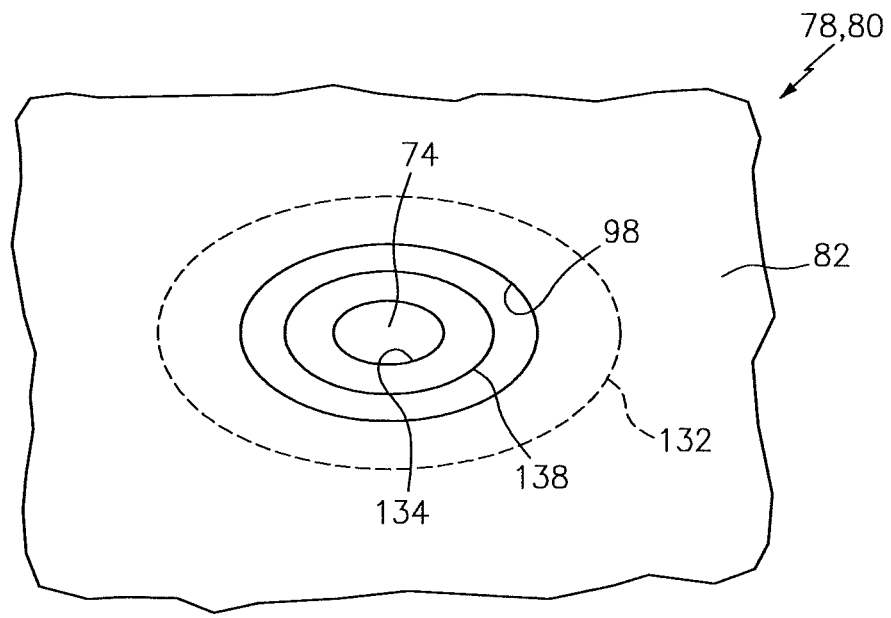
FIG. 15 is an illustration of a portion of an alternate embodiment combustor wall with a ghost line of a shell land beneath a shell.

In some embodiments, referring to FIG. 15, the surface 98 may have an oval cross-sectional geometry. The outer surface 132 may have an oval cross-sectional geometry. The inner surface 134 may have an oval cross-sectional geometry. The outer surface 138 may have an oval cross-sectional geometry. The cross-sectional geometries of one or more of the surfaces 132, 134 and 138 may be proportional to the cross-sectional geometry of the surface 98.

Figure 16:
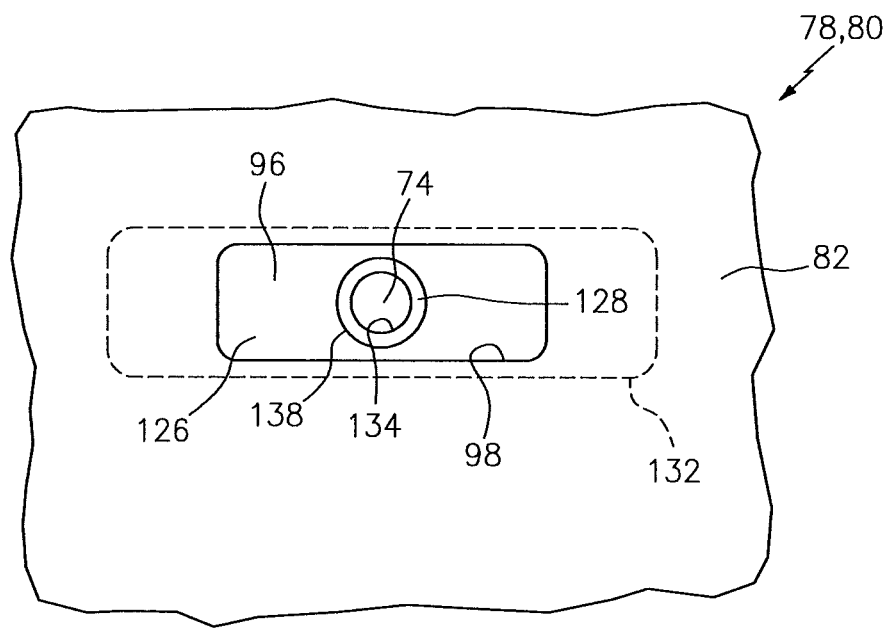
FIG. 16 is an illustration of a portion of an alternate embodiment combustor wall with a ghost line of a shell land beneath a shell.

In some embodiments, referring to FIG. 16, the inner surface 134 may have a circular cross-sectional geometry. The outer surface 138 may have a circular cross-sectional geometry. The surface 98 may have a generally rectangular (or race-track) cross-sectional geometry with, for example, eased corners. In this manner, the surface 98 defines the aperture 96 with an elongated geometry that permits increased thermally induced major axis (e.g., circumferential) movement between the rim 128 and the shell 82. The land outer surface 132 may also have a generally rectangular (or race-track) cross-sectional geometry that enables a seal to be maintained between the land 126 and the shell 82 during the afore-described major axis movement.

Figure 17:
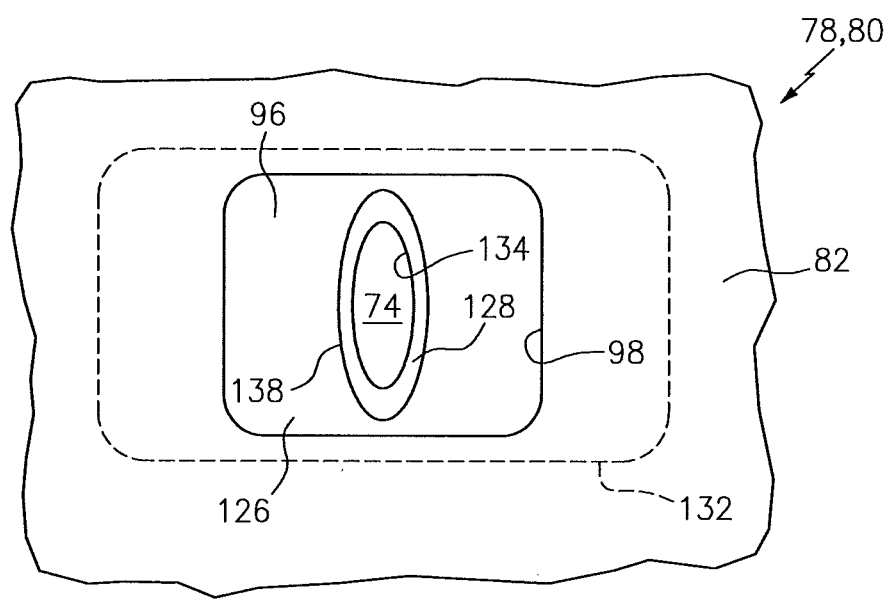
FIG. 17 is an illustration of a portion of an alternate embodiment combustor wall with a ghost line of a shell land beneath a shell.

In some embodiments, referring to FIG. 17, the major and minor axes of the inner surface 134 and the quench aperture 74 may be opposite or otherwise different than the major and minor axes of one or more of the surfaces 98 and 132 and/or the aperture 96.

Figure 18:
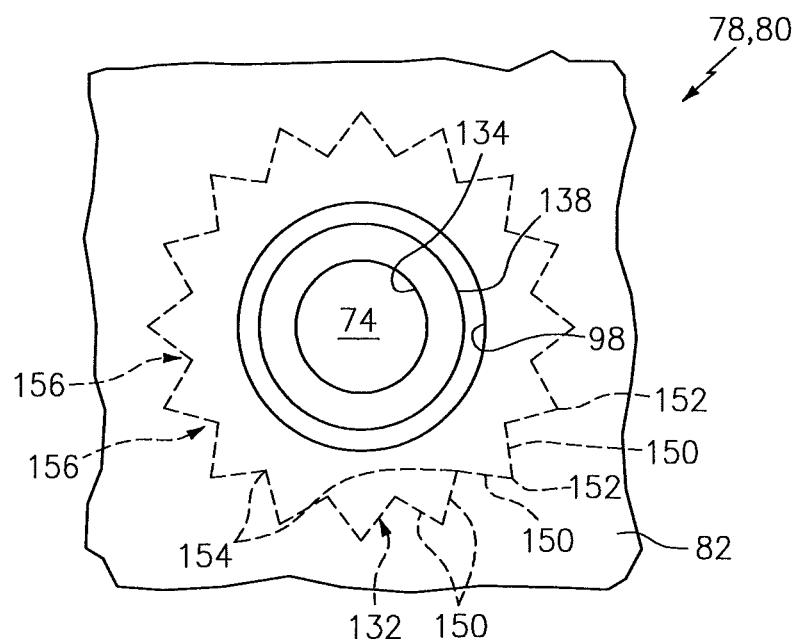
FIG. 18 is an illustration of a portion of an alternate embodiment combustor wall with a ghost line of a shell land beneath a shell.
Figure 19:
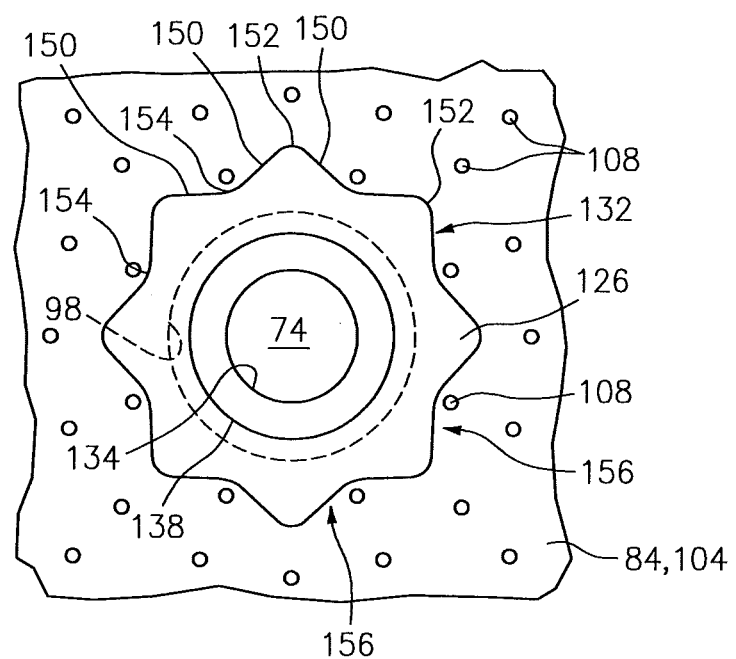
FIG. 19 is an illustration of a portion of a combustor heat shield with a ghost line of a surface defining an aperture in a shell to which the heat shield is attached.

In some embodiments, referring to FIGS. 18 and 19, the surface 132 may include a plurality of facets 150. These facets 150 are arranged circumferentially around the land 126. Some of the facets 150 are respectively joined at a plurality of outside corners 152. Some of the facets 150 are respectively joined at a plurality of inside corners 154. The outside and the inside corners 152 and 154 are arranged circumferentially around the land 126. One or more of the corners 152, 154 may each be a relatively sharp corner as illustrated in FIG. 18. One or more of the corners 152, 154 may each be a relatively dull (e.g., rounded or eased) corner as illustrated in FIG. 19.

The facets 150 respectively form a plurality of indentations 156 that extend into the land 126 to the inside corners 154. The cooling air within the cavity 86 therefore may flow into the indentations 156 and provide additional impingement and/or convective cooling to the panel base 110 and the quench aperture body 88. Referring to FIG. 16, the indentations 156 also enable one or more of the cooling apertures 108 to be located relatively close to the surface 134 and the quench aperture 74 to further increase panel base 110 and/or quench aperture body 88 cooling.

The terms "upstream", "downstream", "inner" and "outer" are used to orientate the components of the turbine engine assembly 62 and the combustor 64 described above relative to the turbine engine 20 and its centerline 22. A person of skill in the art will recognize, however, one or more of these components may be utilized in other orientations than those described above. The present invention therefore is not limited to any particular spatial orientations.

The turbine engine assembly 62 may be included in various turbine engines other than the one described above. The turbine engine assembly 62, for example, may be included in a geared turbine engine where a gear train connects one or more shafts to one or more rotors in a fan section, a compressor section and/or any other engine section. Alternatively, the turbine engine assembly 62 may be included in a turbine engine configured without a gear train. The turbine engine assembly 62 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, the assembly comprising:
    a combustor wall including a shell, a heat shield and an annular land;
    the heat shield attached to the shell; and
    the land extending vertically between the shell and the heat shield and laterally between a land outer surface and an inner surface, the inner surface at least partially defining a quench aperture in the combustor wall;
    wherein a lateral distance between the land outer surface and the inner surface varies around the quench aperture;
    wherein the land outer surface has an oval cross-sectional geometry in a plane perpendicular to a centerline of the quench aperture;
    wherein the land has a distal land surface that slidingly contacts a surface of the shell; and
    wherein the inner surface has a circular cross-sectional geometry in the plane perpendicular to the centerline of the quench aperture.

2. The assembly of claim 1, wherein the land is aligned with a second aperture defined by a second surface of the shell, and the second surface of the shell has a non-circular cross-sectional geometry.

3. The assembly of claim 1, wherein
    the land and an annular rim are included in a grommet; and
    the rim extends from the land one of into and through a second aperture defined by the shell, and has a rim outer surface with a non-circular cross-sectional geometry.

4. The assembly of claim 1, wherein
    the land and an annular rim are included in a grommet; and
    the rim extends from the land one of into and through a second aperture defined by the shell, and has a rim outer surface with a circular cross-sectional geometry.

5. The assembly of claim 1, wherein
    a cavity is defined between the shell and the heat shield; and
    the cavity fluidly couples one or more cooling apertures defined by the shell with one or more cooling apertures defined by the heat shield.

6. The assembly of claim 5, wherein a first of the cooling apertures defined by the heat shield is further defined by and extends through the land.

7. An assembly for a turbine engine, the assembly comprising:
    a combustor wall including a shell, a heat shield and an annular land;
    the heat shield attached to the shell; and
    the land extending between the shell and the heat shield, the land at least partially defining a quench aperture in the combustor wall, and the land axially engaging, relative to a centerline of the quench aperture, the shell;
    wherein the land is aligned with a second aperture defined by a surface of the shell;
    wherein the surface has a surface cross-sectional geometry;
    wherein the land has a land outer surface with a land cross-sectional geometry that comprises a different shape than the surface cross-sectional geometry;
    wherein the surface follows a curved trajectory completely around the centerline;

wherein the land extends laterally between the land outer surface and an inner surface;

wherein a lateral distance between the land outer surface and the inner surface varies around the quench aperture;

wherein the land outer surface has an oval cross-sectional geometry in a plane perpendicular to the centerline of the quench aperture;

wherein the land has a distal land surface that slidingly contacts a second surface of the shell; and wherein the inner surface has a circular cross-sectional geometry in the plane perpendicular to the centerline of the quench aperture.

8. A heat shield for a turbine engine combustor wall through which a quench aperture radially extends, the heat shield comprising:

a heat shield panel including a panel base and a plurality of rails, each of the rails extending radially from the panel base; and an annular land connected to the panel base and located between the rails, the land extending laterally between a land outer surface and an inner surface that at least partially defines the quench aperture;

wherein a lateral distance between the land outer surface and the inner surface changes as the land extends around the inner surface;

wherein the land and an annular rim are included in a grommet;

wherein rim extends radially from the land and away from the panel base, and the rim extends between the inner surface and a rim outer surface;

wherein the land outer surface has an oval cross-sectional geometry in a plane perpendicular to a centerline of the quench aperture;

wherein the panel base circumscribes the land outer surface;

wherein the land has a distal land surface that slidingly contacts a surface of a shell; and wherein the inner surface has a circular cross-sectional geometry in the plane perpendicular to the centerline of the quench aperture.

9. The heat shield of claim 8, wherein the rim outer surface has a non-circular cross-sectional geometry.

10. The heat shield of claim 8, wherein the heat shield panel further includes one or more mechanical attachments adapted to connect the heat shield panel to the shell; and a plurality of effusion apertures are defined by and extend through the panel base.

* * * * *